(12) United States Patent
Canete Cabeza et al.

(10) Patent No.: US 11,869,699 B2
(45) Date of Patent: Jan. 9, 2024

(54) INDUCTIVE ENERGY EMITTER/RECEIVER FOR AN INDUCTIVE CHARGER OF AN ELECTRIC VEHICLE

(71) Applicant: PREMO, S.A., Campanillas (ES)

(72) Inventors: Claudio Canete Cabeza, Benalmadena (ES); Antonio Rojas Cuevas, Malaga (ES); Jorge Rodriguez Moreno, Malaga (ES); Alejandro Jimenez Villada, Meco (ES); Francisco Ezequiel Navarro Perez, Barcelona (ES)

(73) Assignee: PREMO, S.A., Campanillas (ES)

( * ) Notice: Subject to any disclaimer, the term of this patent is extended or adjusted under 35 U.S.C. 154(b) by 604 days.

(21) Appl. No.: 17/057,335

(22) PCT Filed: May 21, 2019

(86) PCT No.: PCT/EP2019/063082
§ 371 (c)(1),
(2) Date: Nov. 20, 2020

(87) PCT Pub. No.: WO2019/224192
PCT Pub. Date: Nov. 28, 2019

(65) Prior Publication Data
US 2021/0193382 A1    Jun. 24, 2021

(30) Foreign Application Priority Data

May 22, 2018   (EP) ..................................... 18382350

(51) Int. Cl.
*H01F 27/26*   (2006.01)
*H01F 27/28*   (2006.01)
(Continued)

(52) U.S. Cl.
CPC .............. *H01F 27/26* (2013.01); *B60L 53/12* (2019.02); *H01F 27/28* (2013.01); *H01F 38/14* (2013.01)

(58) Field of Classification Search
None
See application file for complete search history.

(56) References Cited

U.S. PATENT DOCUMENTS 9,431,834 B2 *   8/2016   Keeling ................. H02J 7/0042
9,972,434 B2 *   5/2018   Keeling ................. H01F 38/14
(Continued)

FOREIGN PATENT DOCUMENTS

CN       104194070 A      12/2014
EP         2573950 A2       3/2013
(Continued)

OTHER PUBLICATIONS

International Search Report and Written Opinion for Corresponding International Application No. PCT/EP2019/063082 (15 Pages) (dated Jul. 5, 2019).

*Primary Examiner* — Leigh M Garbowski
(74) *Attorney, Agent, or Firm* — Lucas & Mercanti, LLP

(57) ABSTRACT

Inductive energy emitter/receiver including a planar-shaped magnetic core with two opposed main surfaces is provided having at least one conductive coil wound around an axis perpendicular to the main surfaces of the planar-shaped magnetic core, said the conductive coil being overlapped to one of the main surfaces of the magnetic core; an inductor casing being attached to the planar-shaped magnetic core and at least one conductive coil. The inductor casing is at least partially made of flexible polymer bonded soft magnetic material, and the planar-shaped magnetic core is a made of a plurality of flexible elongated partial cores, forming a flexible planar shaped magnetic core.

14 Claims, 4 Drawing Sheets

(51) Int. Cl.
*H01F 38/14* (2006.01)
*B60L 53/12* (2019.01)

(56) References Cited

U.S. PATENT DOCUMENTS

| | | | |
|---|---|---|---|
| 10,756,572 B2 * | 8/2020 | Ansari | ............... B60L 53/12 |
| 2013/0249303 A1 | 9/2013 | Keeling et al. | |
| 2013/0249477 A1 | 9/2013 | Keeling et al. | |
| 2017/0338023 A1 | 11/2017 | Ansari et al. | |

FOREIGN PATENT DOCUMENTS

| | | |
|---|---|---|
| EP | 1815558 B1 | 8/2014 |
| EP | 2996119 A1 | 3/2016 |
| EP | 3089176 A1 | 11/2016 |
| WO | 2013092305 A1 | 6/2013 |
| WO | 2016038434 A1 | 3/2016 |

* cited by examiner

INDUCTIVE ENERGY EMITTER/RECEIVER FOR AN INDUCTIVE CHARGER OF AN ELECTRIC VEHICLE

CROSS REFERENCE TO RELATED APPLICATION

This Application is a 371 of PCT/EP2019/063082 filed on May 21, 2019, which claims priority of European Patent Application No. 18382350.9 filed May 22, 2018, both of which are incorporated herein by reference.

TECHNICAL FIELD

The present invention is directed to an inductive energy emitter/receiver for an inductive charger of an electric vehicle. An inductive vehicle charger is constituted by an inductive energy emitter, typically anchored in a static position such the ground, and an inductive energy receiver, typically anchored to a vehicle in a position suitable to be arranged facing the inductive energy emitter and configured to wireless receive power from said inductive energy emitter when the vehicle is in the charging position.

Both the inductive energy emitter and the inductive energy receiver have similar or identical constitution including a magnetic assembly including at least a magnetic core and a conductive coil.

In the inductive energy emitter, electric energy is feed to the conductive coil which, in collaboration with the magnetic core or cores, generates a directed magnetic field. In the inductor energy receiver, being the conductive coil inside the magnetic field generated by the inductive energy emitter, said magnetic field induces the generation of an electric current on said conductive coil, and said electric energy can be connected for example to a vehicle battery to produce its charge.

"Inductor casing" means in this description a continuous mass surrounding the whole of the magnetic assembly that can include the magnetic core and the conductive coil.

PBM will refer in this description to a polymer bonded soft magnetic material that will be used in various parts of the inductive energy emitter/receiver to be described below.

STATE OF THE ART

The inductive energy emitter/receiver for an inductive charger using a conductive coil in combination with a rigid magnetic core and a casing are known in the state of the art, but the rigid magnetic core is typically thin and made of a brittle material such ferrite. The size of the inductive energy emitter/receiver sufficient to allow a fast charging of an electric vehicle will be typically comprised between 400 cm 2 and 10000 cm 2, and a thin magnetic core of this size made of a brittle material will be easily broken.

Document WO2013092305A1 describe an inductive wireless charging system for mobile devices such smart phones. This document describe the use of a conductive coil combined with a magnetic core made of moulded flexible polymer bonded soft magnetic material, but this document does not describe the use of a magnetic core other than said polymer bonded soft magnetic material, which will be unable to manage by itself the amount of energy required for a fast charge an electric vehicle.

Document CN104194070 describe a similar proposal using a manganese zinc ferrite powder and rubber in a weight ratio of (1:3)-(3:1) as a flexible magnetic core. This product used as a magnetic core is considered unable to withstand the requirements for a fast charging of an electric vehicle.

For other uses the flexible magnetic cores with improved magnetic properties are already known.

For example, document WO2016038434 describe a flexible antenna constituted by a flexible polymer bonded soft magnetic material including parallel wires embedded therein.

Also, document EP3089176 describe an alternative solution of an antenna using a flexible magnetic core constituted by a chain of rigid magnetic cores connected to each other in an articulated manner to each other on their ends and covered using a flexible polymer bonded soft magnetic material.

On said documents the magnetic core is used for a low energy requirement, and are used isolated from other magnetic cores, being one of said magnetic cores unable to withstand by itself the energy requirements of a fast vehicle charging.

US20170338023 of Lear Corporation discloses an inductive energy emitter/receiver for an inductive charger of an electric vehicle including a planar-shaped magnetic core with two opposed main surfaces, at least one conductive coil wound around an axis perpendicular to the main surfaces of the planar-shaped magnetic core and an inductor casing partially made of flexible polymer bonded material being attached to said planar shaped magnetic core an said conductive coil. An electronics assembly is arranged (see FIG. 2) adjacent top wall of a coolant assembly and magnetics assembly (magnetic core) is arranged adjacent bottom wall of the coolant assembly. Coolant is circulated through coolant channel via a pump or the like. As shown in FIG. 6B magnetic assembly includes one or more ferrite tiles to maximise the efficiency of the magnetic coupling and an induction coil arrangement.

US20130249477 of Qualcomm Incorporated discloses an inductive energy emitter/receiver for an inductive charger constituting a wireless power transfer apparatus for an electric vehicle including a coil and a planar magnetic core provided by a plurality of cores or magnetically permeable members, provided in FIG. 4 by ferromagnetic blocks 303 that are positioned in parallel alignment within the wireless power transfer device. The apparatus comprises a first casing portion having a wall with a plurality of projecting members extending from an inner surface of the wall and a second casing portion connected to the first casing portion to form a chamber within which the coil and magnetically permeable members are housed and a potting material disposed to fill the chamber.

CN104194070 of Wuxi Spinel Magnetics Co. discloses a soft ferrite composite material wherein soft ferrite powder is dispersed in a rubber base so that the product performance fully meets the conventional design requirements of electromagnetic shielding and anti-electromagnetic interference at normal temperature and the product has good flexibility and is easy to process.

BRIEF DESCRIPTION OF THE INVENTION

The present invention relates to an inductive energy emitter/receiver for an inductive electric charger of an electric vehicle.

An inductive energy emitter/receiver is a device which can transform electric energy into a magnetic field, or which can generate electric energy when is affected by a magnetic field, depending on its configuration.

Placing two of said inductive energy emitter/receivers facing each other and feeding one of them with electric energy permits the transmission of most of this energy to the other allowing a contactless energy transmission, for example for charging the batteries of an electric vehicle equipped with an inductive energy emitter/receiver on its floor parked over an inductive energy emitter/receiver fixed to the ground.

The proposed inductive energy emitter/receiver includes as known in the state of the art, by one or more of the above antecedents:
- a planar-shaped magnetic core with two opposed main surfaces;
- at least a conductive coil wound around an axis perpendicular to the main surfaces of the planar-shaped magnetic core, said conductive coil being overlapped to one of said main surfaces of the magnetic core;
- an inductor casing attached to said planar-shaped magnetic core and to said at least one conductive coil;

The performance of the inductive energy emitter/receiver depends, upon other parameters, on the volume of the magnetic core and on its geometry. In order to increase the efficiency in the energy transmission is preferable both inductive energy emitter/receiver having a big area facing each other.

Therefore, the preferred geometry of the magnetic core is a planar-shaped magnetic core with a flat configuration and a thin thickness (being the width at least twenty times the thickness), defining two main surfaces of the planar-shaped magnetic core.

Preferably the conductive coil is wound in spiral shape creating a flat coil with an increasing size, with a thickness of one or multiple layers.

The proposed invention also proposes the following features which are not known in the state of the art:
- the planar-shaped magnetic core is a made of a plurality of flexible elongated partial cores, forming a flexible planar-shaped magnetic core, wherein each of the flexible elongated partial cores is perpendicular to an overlapped section of the conductive coil; and
- the inductor casing is at least partially made of flexible polymer bonded soft magnetic material (PBM) filling interspaces between the flexible elongated partial cores.

Said flexible polymer bonded soft magnetic material is a polymer matrix including, for example, microfibers, micro-particles and/or nanoparticles of a soft ferromagnetic material present alone or in any combination thereof inside the polymer matrix.

Furthermore, the mentioned microfibers, micro-particles and/or nanoparticles of a soft ferromagnetic material preferably represent about at least 50% of the total weight of the polymer casing.

Soft magnetic materials are those materials that are easily magnetized and demagnetized, typically having intrinsic coercivity less than 1000 $Am^{-1}$, which enhance and/or channel the flux produced by the conductive coil. Thus, a soft magnetic material is a relatively permeable material, which is a measure of how readily the material responds to the applied magnetic field.

Said flexible polymer bonded soft magnetic material, constitutive of the inductor casing increases the efficiency of the inductive energy emitter/receiver, extending the influence of the planar-shaped magnetic core using also the inductor casing as part of said magnetic core.

An inductive energy emitter/receiver intended for an inductive electric charger of an electric vehicle will be frequently placed in the same floor on which said vehicle circulates, said vehicle easily circulating over the inductive energy emitter/receiver, or on the floor of the vehicle, where it can be hit by a stone, a kerb or a speed bump while the vehicle is in motion.

A planar-shaped magnetic core with a small thickness made of a rigid monolithic material which is typically a brittle material, for example ferrite, will be easily broken under the weight of the vehicle or when hit, therefore frequently said inductor energy emitter/receivers are provided with a heavy shield which can withstand the vehicle weight or the impacts without transmitting loads to the planar-shaped magnetic core, but increasing the thickness, the cost and the weight thereof.

On the contrary the present invention proposes the planar-shaped magnetic core being constituted by a plurality of flexible elongated partial cores surrounded by the flexible inductor casing, creating in conjunction a planar-shaped magnetic core flexible in two orthogonal directions.

A flexible magnetic core can absorb impacts and weight without breaking, producing its temporary deformation, therefore not requiring a heavy shield.

The flexible magnetic core is obtained by the combination of the inductor casing, which is made of a flexible polymer bonded soft magnetic material and therefore being flexible and magnetic responsive material, and elongated partial cores made of magnetic material and having an elongated shape, for example rectangular section bars, being said elongated partial cores also flexible.

The magnetic behaviour of each elongated partial core collaborates with the other elongated partial cores thanks to their connection through the inductor casing, producing in conjunction a magnetic behaviour similar to that produced by a monolithic rigid magnetic core made for example of ferrite.

According to one embodiment the flexible elongated partial cores are made of parallel continuous ferromagnetic wires made from high-permeability soft magnetic alloys over-moulded with elongated casings as part of the inductor casing.

Both the wires and the elongated casing are flexible, and therefore the resulting assembly is also flexible.

Each elongated casing of each elongated partial core can be an independent elongated casing, being the plurality of elongated casings attached to the rest of the inductor casing, for example by means of adhesive.

Alternatively, the wires can be embedded in the inductor casing, being a portion of said inductors casing surrounding said wires called elongated casing, for each group of wires correspondent to an elongated partial core.

According to a different embodiment of the elongated partial cores, each elongated partial core will be formed by a plurality of rigid magnetic cores made from ferromagnetic material, connected in an articulated manner to one another at their ends and over-moulded with an elongated casing preferable in PBM as part of the inductor casing.

Said articulated attachment can be obtained for example through a complementary concave and convex round configuration on the ends of each rigid magnetic core connected to each other, allowing the articulated movement between them without spacing them to each other, which would reduce the efficiency of the system.

Each elongated casing of each elongated partial core can be an independent elongated casing, being the plurality of elongated casings attached to the rest of the inductor casing, for example by means of adhesive.

Alternatively, the rigid magnetic cores can be embedded in the inductor casing

According to this embodiment the articulated attachment between the rigid magnetic cores, and the elongated casings being made of a flexible polymer bonded soft magnetic material, the magnetic dispersion between the linked rigid magnetic cores is avoided, and the elongated partial cores collaborate as a single magnetic core through said flexible polymer bonded soft magnetic material.

It is also proposed that the elongated partial cores are spaced apart to each other. The performance of the magnetic core depends mainly of the volume of ferromagnetic material, therefore a plurality of spaced apart elongated partial cores can provide the same performance a very thin planar-shaped magnetic core made of a single plate, but being the elongated partial cores thicker (and therefore stronger) than the very thin planar-shaped magnetic core made of a single plate.

Moreover, the planar-shaped magnetic core including the elongated partial cores as explained above is in thermal contact with a sheet of thermal conductive compound for heat dissipation.

The inductor casing can include a conductive coil former which supports the conductive coil, and a magnetic core casing which supports the elongated partial cores constitutive of the magnetic core, being said conductive coil former and said magnetic core casing attached to each other, for example using adhesives, constituting a two part casing.

In such case the at least one conductive coil can be embedded in the conductive coil casing.

According to an embodiment groups of elongated partial cores partial cores are adjacent and in contact to each other. As per a particular arrangement said groups of elongated partial cores are four and they are arranged around a central opening in a cross configuration with the central opening overlapping a coil free zone of the coil.

Moreover, in the last referred embodiment additional elongated partial cores are arranged in the corner regions between said groups in a cross configuration.

In this way, and as will be seen most clearly in the figures the set of the various elongated partial cores are arranged radially around a central opening.

According to an embodiment of the invention, the inductor casing includes a central protrusion, protruding in the direction of the central axis, around of which the conductive coil is wound.

The inductive energy emitter/receiver of this invention is built from a housing made of a pan shaped base and a lid, the pan-shaped base containing the planar-shaped magnetic core the inductive coil and the inductor casing.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and not limitative way, in which.

DETAILED DESCRIPTION OF AN EMBODIMENT

Figure 1:
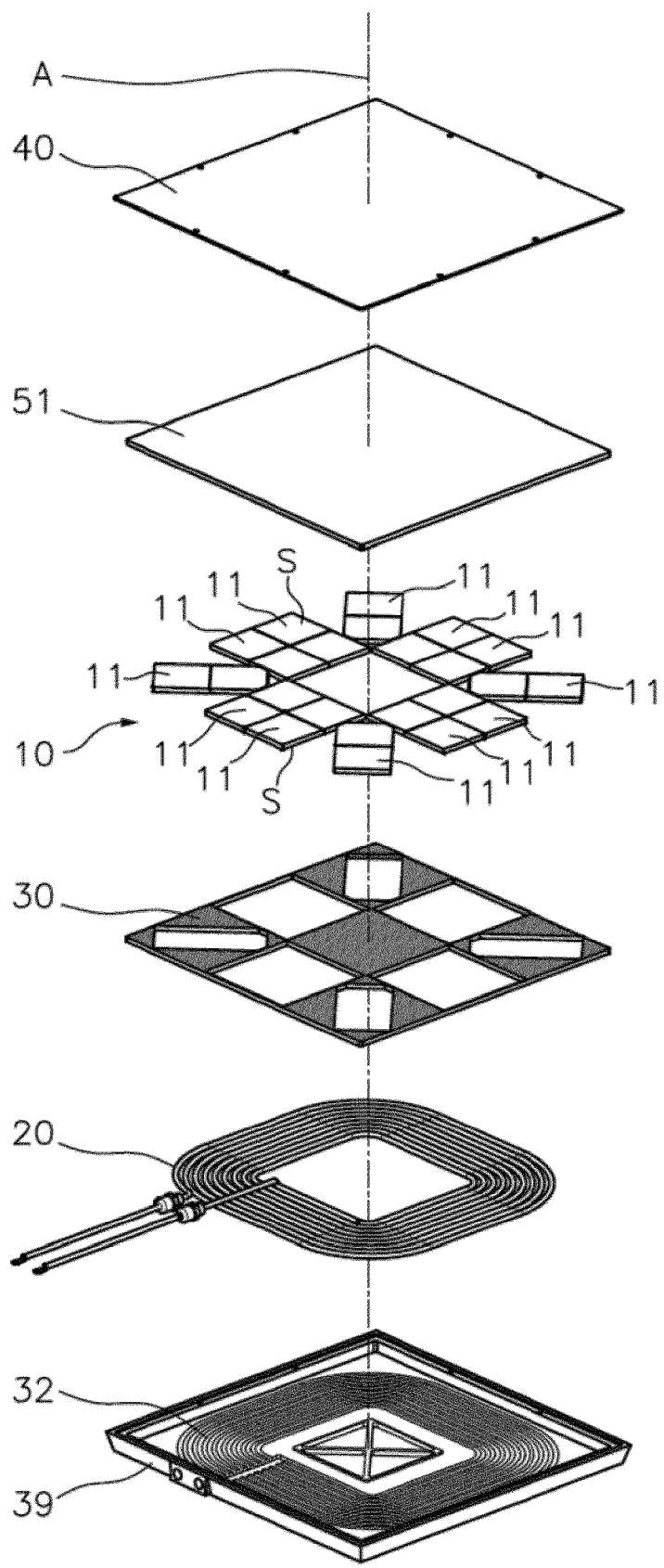
FIG. 1 shows an exploded view of the inductive energy emitter/receiver of this invention according to an embodiment.
Figure 2:
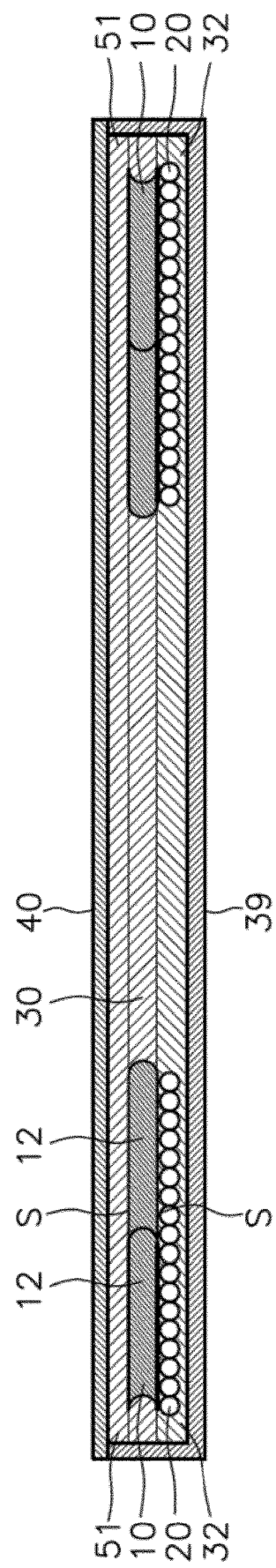
FIG. 2 is a cross section of an inductive energy emitter/receiver for an inductive charger, according to this invention.

In the present invention an inductive energy emitter/receiver for an inductive charger of an electric vehicle including a flexible and planar-shaped magnetic core 10, that overlaps a planar conductive core 20, is proposed.

The proposed flexible planar-shaped magnetic core 10 can flex without breaking when it is impacted or compressed. Moreover, the flexible planar-shaped magnetic core is surrounded and or embedded in a PBM material 30 providing a casing, also flexible, so that all the assembly is flexible.

In order to obtain an efficient flexible planar-shaped magnetic core 10 it is proposed to make it of a plurality of flexible elongated partial cores 11 coplanarly laid out and radially arranged around a central opening that overlaps another opening in the adjacent planar coil 20 so that each of the flexible elongated partial cores 11 is perpendicular to an overlapped section of the conductive planar coil 20. And inductor material 30 in PBM surrounds the set of elongated partial cores 11 providing a casing 30.

The inductor casing 30 collaborates magnetically with the elongated partial cores 11 producing, in conjunction, an effect equivalent to the effect produced by a single monolithic magnetic core 10.

Each elongated partial core 11 is flexible, and the inductor casing 30 is also flexible, therefore the conjunction of both produces a flexible element.

The result of said attachment is a planar-shaped composed magnetic core 10 with two main surfaces S. A planar conductive coil 20 is wound around an axis A perpendicular to said main surfaces S, being said conductive coil 20 overlapped to one of said main surfaces S of the magnetic core 10.

This planar-shaped composed magnetic core is further in thermal contact with a sheet of thermal conductive compound 51 for heat dissipation which is arranged on the other side of the magnetic core 10 opposite to the one facing the conductive coil 20.

An electric current circulating on said conductive coil 20 generates a magnetic field, and a magnetic field affecting said conductive coil 20 generates an electric current.

According to a first embodiment of the present invention, shown on FIG. 1 the proposed inductive energy emitter/receiver is planar-shaped and squared.

In an embodiment each elongated partial core 11 is embedded in a PBM covering.

The aggregate of radially arranged elongated partial cores 11 and PBM casing 30 is overlapped and attached to a conductive coil former 32.

The conductive coil former 32 includes a central protrusion protruding in a direction perpendicular to the main surface S of the magnetic core 10 resulting from the aggregation of said multiple elongated partial cores 11, thus in the direction of the central axis A. The protrusion of the coil former coincides with the central opening of the magnetic core 10.

A conductive coil 20 is wound around said central axis A, surrounding said central protrusion of the coil former 32.

Figure 5:
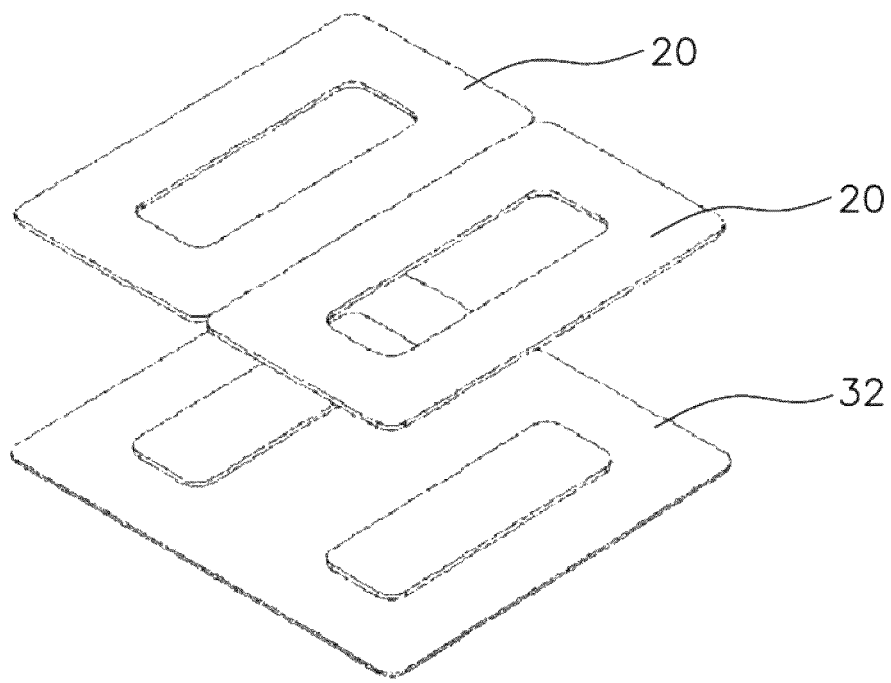
FIGS. 5 and 6 shows perspective view of two different embodiments in which the conductive coil is composed by two conductive coils adjacent to each other or partially overlapped to each other.
Figure 6:
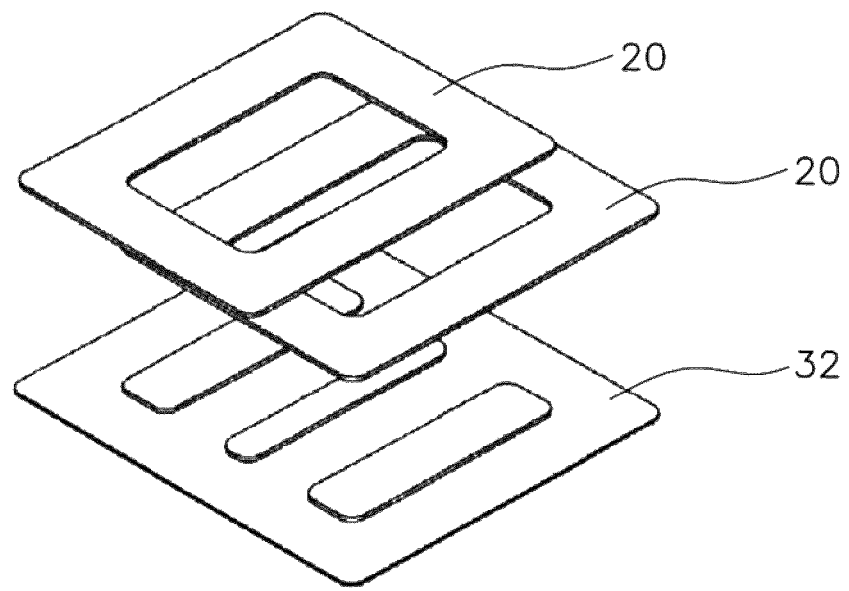

Alternatively said conductive coil 20 can include for example two or three conductive coils 20 adjacent to each other, as shown on FIG. 5 or partially overlapped, as shown on FIG. 6. On those examples the conductive coil former 32 includes two or three central protrusions, being each conductive coil 20 wound around one or two of said central protrusions.

The inductive energy emitter/receiver is completed by a pan shaped base 39 and a lid 40, the pan-shaped base 39 containing the inductive coil 20 the planar-shaped magnetic core 10 the inductor casing 30 and the sheet of thermal conductive compound 51. In an embodiment the lid 40 can be of Al.

Figure 3:
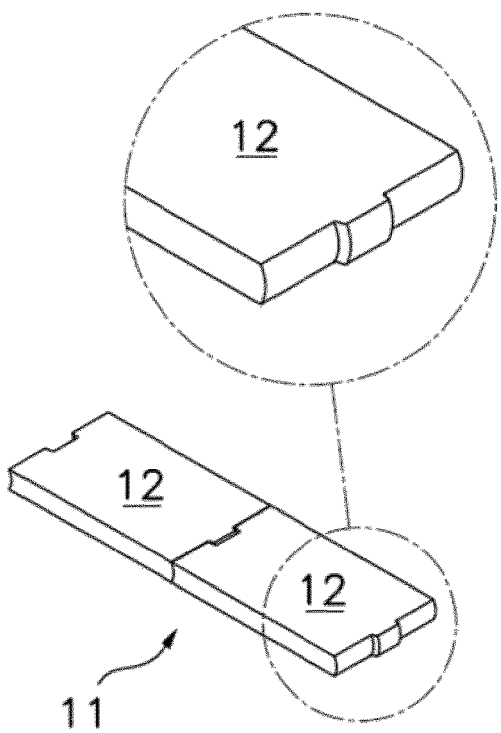
FIG. 3 shows a perspective view of one elongated partial core made of a chain of rigid magnetic cores connected to each other in an articulated manner, without an overmoulded elongated casing, and a zoomed view of its end.
Figure 3A:
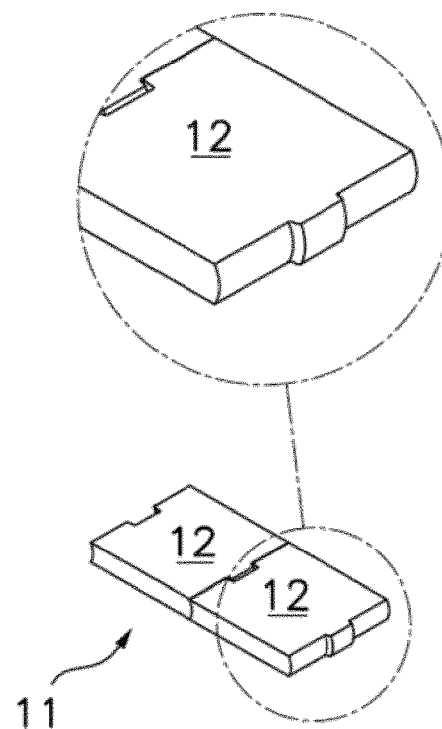
FIG. 3a is equivalent to FIG. 3 but with each rigid magnetic core of the chain, quadrangular.

Each flexible elongated partial core 11 can be obtained by a plurality of rigid magnetic cores 12 connected in an articulated manner to one another of their respective ends and with a PBM covering creating a flexible chain, as shown on FIGS. 3 and 3a.

Preferably said ends are rounded concave and convex complementary ends and could include a protrusion to prevent a misalignment of the rigid magnetic cores 12.

Said rigid magnetic cores 12 are preferably made of ferrite or ferrite alloy, but despite said material being brittle, its construction in small articulated elements prevents its breaking when receive impacts or compression. A covering of PBM envelops all individual rigid magnetic cores 12 in the chain.

Figure 4:
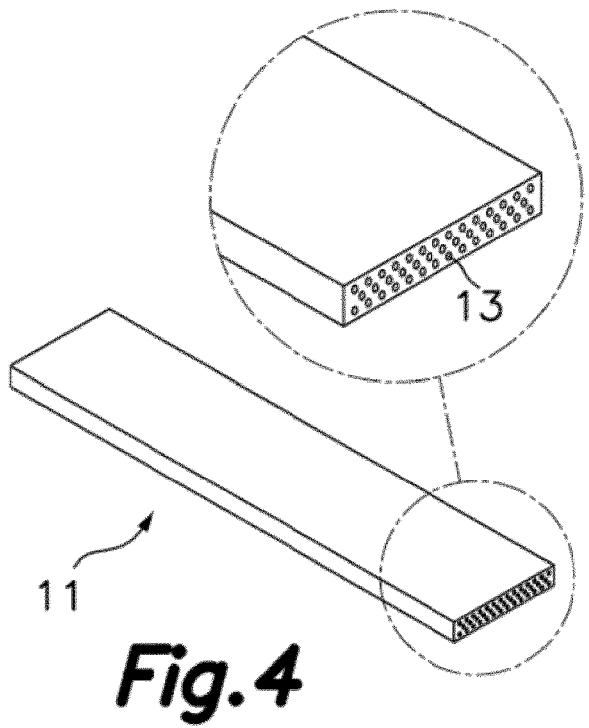
FIG. 4 shows a perspective view of one elongated partial core made of parallel continuous ferromagnetic wires made from high-permeability soft magnetic alloys over-moulded with an elongated PBM casing, and a zoomed view of its end.

In an alternative embodiment shown on FIG. 4, each elongated partial core 11 is made of parallel continuous ferromagnetic wires 13 made from high-permeability soft magnetic alloys over-moulded with an elongated casing.

Returning to the FIG. 1, the embodiment shows that groups of elongated partial cores 11 are adjacent and in contact to each other. Specifically said groups are four groups, each containing in this example two parallel, adjacent elongated partial cores, arranged around a central opening in a cross configuration. The elongated partial cores are here constituted by two quadrangular core elements as illustrated in FIG. 3a, while a rectangular shape as in FIG. 3 can also be used.

Also, additional elongated partial cores 11 are arranged in corner regions between said groups in a cross configuration.

Thus, the planar-shaped magnetic core 10 is formed by radial formations of elongated partial cores 11, surrounding a central opening and superimposed on the planar coil 20.

As previously stated, the planar conductive coil 20 can include two conductive coils adjacent to each other or in an alternative embodiment be made by two conductive coils 20 partially overlapped to each other. FIGS. 5 and 6 illustrate these embodiments. It will be understood that various parts of one embodiment of the invention can be freely combined with parts described in other embodiments, even being said combination not explicitly described, provided there is no harm in such combination.

The invention claimed is:

1. Inductive energy emitter/receiver for an inductive charger of an electric vehicle wherein said inductive energy emitter/receiver includes:
a planar-shaped magnetic core with two opposed main surfaces (S);
at least one planar conductive coil wound around an axis (A) perpendicular to the main surfaces (S) of the planar-shaped magnetic core, said planar conductive coil being overlapped to one of said main surfaces (S) of the magnetic core;
an inductor casing being attached to said planar-shaped magnetic core and said at least one planar conductive coil wherein the planar-shaped magnetic core is a made of a plurality of elongated partial cores, radially arranged, around a central opening that overlaps another opening in the planar coil that is adjacent, wherein each of the flexible elongated partial cores is perpendicular to an overlapped section of the planar conductive coil, each elongated partial core is flexible;
the inductor casing is a flexible inductor casing made of flexible polymer bonded soft magnetic material, filling interspaces between the flexible elongated partial cores, and
the flexible elongated partial cores are surrounded by the flexible inductor casing, creating in conjunction a planar-shaped magnetic core flexible in two orthogonal directions, wherein the flexible inductor casing collaborates magnetically with the flexible elongated partial cores producing, in conjunction, an effect equivalent to the effect produced by a single monolithic magnetic core.

2. Inductive energy emitter/receiver according to claim 1, wherein each of the flexible elongated partial cores is made of parallel continuous ferromagnetic wires made from high-permeability soft magnetic alloys over-moulded with an elongated casing as part of the inductor casing.

3. Inductive energy emitter/receiver according to claim 2 wherein the flexible elongated partial cores are spaced apart to each other.

4. Inductive energy emitter/receiver according to claim 1, wherein each of the flexible elongated partial cores is formed by a plurality of rigid magnetic cores made from ferromagnetic material, connected in an articulated manner to one another at their ends and over-moulded with an elongated casing as part of the inductor casing.

5. Inductive energy emitter/receiver according to claim 4, wherein each flexible elongated partial core includes two quadrangular members linked by their ends and over moulded with a PBM material.

6. Inductive energy emitter/receiver according to claim 4, wherein each flexible elongated partial core includes two rectangular members linked by their ends and over moulded with a PBM material.

7. Inductive energy emitter/receiver according to claim 1, wherein the planar-shaped magnetic core is in thermal contact with a sheet of thermal conductive compound for heat dissipation.

8. Inductive energy emitter/receiver according to claim 1, wherein the at least one conductive coil is embedded in the inductor casing.

9. Inductive energy emitter/receiver according to claim 1, wherein groups of flexible elongated partial cores are adjacent and in contact to each other.

10. Inductive energy emitter/receiver according to claim 1, wherein groups of flexible elongated partial cores are adjacent and in contact to each other and wherein said groups of flexible elongated partial cores are four groups radially arranged around a central opening in a cross configuration.

11. Inductive energy emitter/receiver according to claim 1, wherein groups of flexible elongated partial cores are adjacent and in contact to each other, said groups of flexible elongated partial cores being four groups radially arranged around a central opening in a cross configuration; and wherein additional flexible elongated partial cores are radially arranged in corner regions between said groups in a cross configuration.

12. Inductive energy emitter/receiver according to claim 1, wherein the at least one conductive coil comprises two conductive coils adjacent to each other.

13. Inductive energy emitter/receiver according to claim 1, wherein the at least one conductive coil comprising two conductive coils partially overlapped to each other.

14. Inductive energy emitter/receiver according to claim 1, further comprising a housing made of a pan shaped base and a lid, the pan-shaped base containing the planar-shaped magnetic core the inductive coil and the flexible inductor casing.

* * * * *